(12) United States Patent
Anderson

(10) Patent No.: US 11,781,406 B2
(45) Date of Patent: Oct. 10, 2023

(54) PROCESS FOR PROVIDING STEAM FOR A HYDROCARBON RECOVERY PROCESS

(71) Applicant: Cenovus Energy Inc., Calgary (CA)

(72) Inventor: Timothy Bennet Anderson, Calgary (CA)

(73) Assignee: Cenovus Energy Inc., Calgary (CA)

( * ) Notice: Subject to any disclaimer, the term of this patent is extended or adjusted under 35 U.S.C. 154(b) by 93 days.

(21) Appl. No.: 17/507,716

(22) Filed: Oct. 21, 2021

(65) Prior Publication Data

US 2022/0127939 A1    Apr. 28, 2022

Related U.S. Application Data

(60) Provisional application No. 63/104,444, filed on Oct. 22, 2020.

(51) Int. Cl.
*E21B 43/24* (2006.01)
*F16L 53/38* (2018.01)

(52) U.S. Cl.
CPC .......... *E21B 43/2406* (2013.01); *F16L 53/38* (2018.01)

(58) Field of Classification Search
CPC . F16L 53/30; F16L 53/35; F16L 53/38; E21B 43/2406
See application file for complete search history.

(56) References Cited

U.S. PATENT DOCUMENTS

| | | | | | |
|---|---|---|---|---|---|
| 3,706,872 | A | * | 12/1972 | Trabilcy | F16L 53/34 |
| | | | | | 219/535 |
| 2014/0224192 | A1 | * | 8/2014 | Bool, III | F22B 1/22 |
| | | | | | 122/31.1 |

FOREIGN PATENT DOCUMENTS

CA        2745879 A1    6/2010

OTHER PUBLICATIONS

Santos et al., "An Overview of Heavy Oil Properties and Its Recovery and Transportation Methods," Brazilian Journal of Chemical Engineering, Jul.-Sep. 2014, vol. 31 (3), pp. 571-590.

* cited by examiner

*Primary Examiner* — Robert E Fuller
(74) *Attorney, Agent, or Firm* — GORDON & JACOBSON, P.C.

(57) ABSTRACT

A hydrocarbon recovery process for recovering hydrocarbons from a hydrocarbon-bearing formation includes preheating a pipe coupling a steam generation facility to a well for injection of steam into the hydrocarbon-bearing formation by controlling heat traces extending along the pipe, directing steam generated at the steam generation facility, through the pipe after preheating, and injecting the steam into the hydrocarbon-bearing formation via the well, and controlling heat input to the pipe by controlling the heat traces extending along the pipe as the steam travels through the pipe. Fluids are produced from the hydrocarbon-bearing formation.

28 Claims, 10 Drawing Sheets

PROCESS FOR PROVIDING STEAM FOR A HYDROCARBON RECOVERY PROCESS

TECHNICAL FIELD

The present invention relates to providing steam from a steam generation facility for use in a hydrocarbon recovery process.

BACKGROUND

Extensive deposits of hydrocarbons exist around the world. Reservoirs of such deposits may be referred to as reservoirs of light oil, medium oil, heavy oil, extra-heavy oil, bitumen, or oil sands, and include large oil deposits in Alberta, Canada. It is common practice to segregate petroleum substances into categories that may be based on oil characteristics, for example, viscosity, density, American Petroleum Institute gravity ($°$ API), or a combination thereof. For example, light oil may be defined as having an $°$ API$\geq$31, medium oil as having an $°$ API$\geq$22 and <31, heavy oil as having an $°$ API$\geq$10 and <22 and extra-heavy oil as having an $°$ API$\leq$10 (see Santos, R. G., et al. *Braz. J. Chem. Eng.* Vol. 31, No. 03, pp. 571-590). Although these terms are in common use, references to different types of oil represent categories of convenience, and there is a continuum of properties between light oil, medium oil, heavy oil, extra-heavy oil, and bitumen. Accordingly, references to such types of oil herein include the continuum of such substances, and do not imply the existence of some fixed and universally recognized boundary between the substances.

One thermal method of recovering viscous hydrocarbons in the form of bitumen, also referred to as oil sands, is known as steam-assisted gravity drainage (SAGD). In the SAGD process, pressurized steam is delivered through an upper, horizontal, injection well, also referred to as an injector, into a viscous hydrocarbon reservoir while hydrocarbons are produced from a lower, generally parallel, horizontal, production well, also referred to as a producer, that is near the injection well and is vertically spaced from the injection well. The injection and production wells are generally situated in the lower portion of the reservoir, with the producer located close to the base of the hydrocarbon reservoir to collect the hydrocarbons that flow toward the base of the reservoir.

The injected steam during SAGD initially mobilizes the hydrocarbons to create a steam chamber in the reservoir around and above the horizontal injection well. The term steam chamber in the context of a SAGD operation is utilized to refer to the volume of the reservoir that is heated to the steam saturation temperature with injected steam, and from which mobilized oil has at least partially drained and been replaced with steam vapor. As the steam chamber expands, viscous hydrocarbons in the reservoir and water originally present in the reservoir are heated and mobilized and move with aqueous condensate, under the effect of gravity, toward the bottom of the steam chamber. The hydrocarbons, the water originally present, and the aqueous condensate are typically referred to collectively as emulsion. The emulsion accumulates and is collected and produced from the production well. The produced emulsion is separated into dry oil for sales and produced water.

The steam that is utilized is produced in a steam generation facility including a steam generator, such as a once through steam generator (OTSG). The cost of the steam generation facility and associated emissions control is significant and affects the economic potential of hydrocarbon recovery.

Improvements in providing steam for hydrocarbon recovery are desirable.

SUMMARY

According to an aspect of an embodiment, there is provided a hydrocarbon recovery process for recovering hydrocarbons from a hydrocarbon-bearing formation. The process includes preheating a pipe coupling a steam generation facility to a well for injection of steam into the hydrocarbon-bearing formation by controlling heat traces extending along the pipe, directing steam generated at the steam generation facility, through the pipe after preheating, and injecting the steam into the hydrocarbon-bearing formation via the well, and controlling heat input to the pipe by controlling the heat traces extending along the pipe as the steam travels through the pipe. Fluids are produced from the hydrocarbon-bearing formation.

According to another aspect, a process is provided for providing steam from a steam generation facility to a well of a hydrocarbon-bearing formation. The process includes measuring temperatures at various locations along the pipe and heating the pipe utilizing heat traces along the pipe to preheat the pipe, directing the steam through the pipe after preheating, and continuing temperature measurement at the various locations and controlling the heat traces to control pipe temperature as the steam flows along the pipe.

According to another aspect, a process for transporting steam from a steam generation facility is provided. The process includes measuring temperatures at various locations along a pipe coupled to the steam generation facility, and preheating the pipe by controlling heat traces that extend along a pipe based on the measured temperatures. In response to a temperature of the measured temperatures being below a preheat target temperature, adding heat utilizing a heat trace of the heat traces, and, in response to the temperature meeting the preheat target temperature, discontinuing adding heat utilizing the heat trace. The process also includes directing steam generated at the steam generation facility, through the pipe after preheating to transport the steam from the steam generation facility, and continuing measuring temperatures as the steam travels through the pipe and controlling the heat traces based on the measured temperatures as the steam travels through the pipe.

BRIEF DESCRIPTION OF THE DRAWINGS

Embodiments of the present invention will be described, by way of example, with reference to the drawings and to the following description, in which.

DETAILED DESCRIPTION

Figure 1:
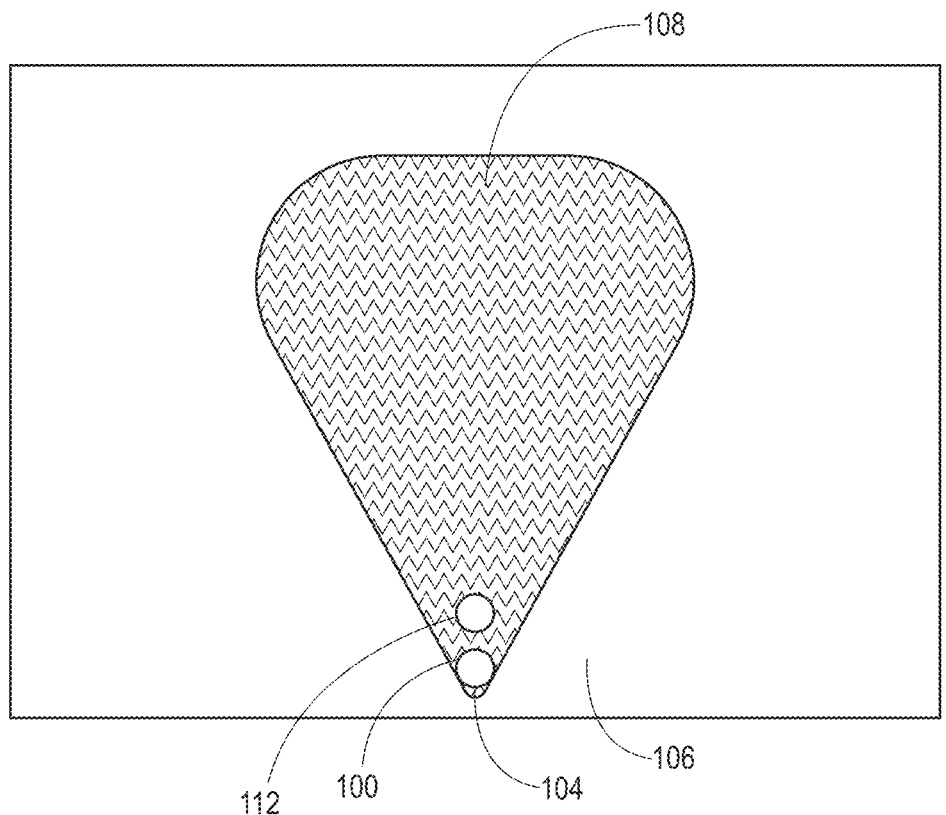
FIG. 1 is a sectional view through a reservoir, illustrating a SAGD well pair.

The disclosure generally relates to a hydrocarbon recovery process for recovering hydrocarbons from a hydrocarbon-bearing formation. The process includes preheating a pipe coupling a steam generation facility to a well for injection of steam into the hydrocarbon-bearing formation by controlling heat traces extending along the pipe, directing steam generated at the steam generation facility, through the pipe after preheating, and injecting the steam into the hydrocarbon-bearing formation via the well, and controlling heat input to the pipe by controlling the heat traces extending along the pipe as the steam travels through the pipe. Fluids are produced from the hydrocarbon-bearing formation.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

Reference is made herein to an injection well and a production well. The injection well and the production well may be physically separate wells. Alternatively, the production well and the injection well may be housed, at least partially, in a single physical wellbore, for example, a multilateral well. The production well and the injection well may be functionally independent components that are hydraulically isolated from each other, and housed within a single physical wellbore.

Figure 2:
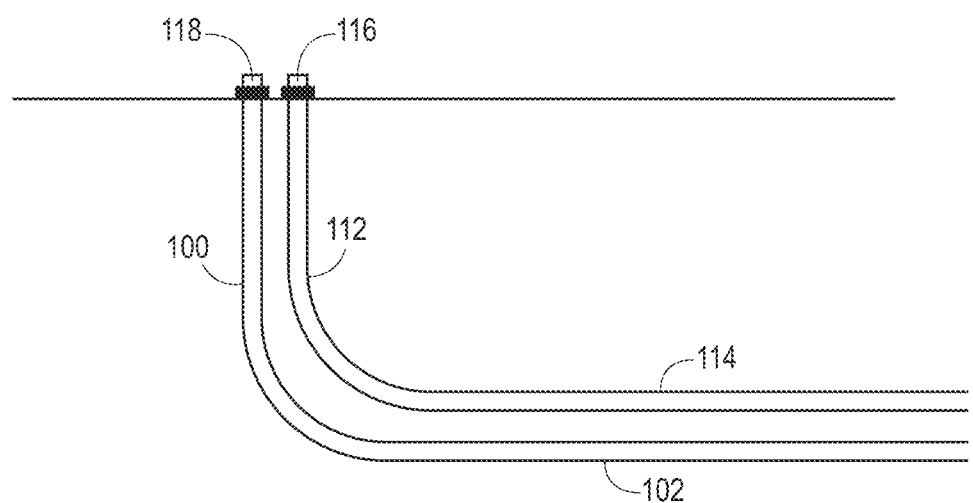
FIG. 2 is a sectional side view illustrating a SAGD well pair including an injection well and a production well.

As described above, a steam-assisted gravity drainage (SAGD) process may be utilized for mobilizing viscous hydrocarbons. In the SAGD process, a well pair, including a hydrocarbon production well and a steam injection well are utilized. An example of a well pair is illustrated in FIG. 1 and FIG. 2. The hydrocarbon production well 100 includes a generally horizontal portion 102 that extends near the base or bottom 104 of the hydrocarbon reservoir 106. An injection well 112 also includes a generally horizontal portion 114 that is disposed generally parallel to and is spaced vertically above the horizontal portion 102 of the hydrocarbon production well 100.

During production utilizing SAGD, steam is injected into the injection well head 116 and through the steam injection well 112 to mobilize the hydrocarbons and create a steam chamber 108 in the reservoir 106, around and above the generally horizontal portion 114.

Viscous hydrocarbons in the reservoir 106 are heated and mobilized and the mobilized hydrocarbons drain under the effects of gravity. Fluids, including the mobilized hydrocarbons along with condensate, are collected in the generally horizontal portion 102 and are recovered via the hydrocarbon production well 100. Production may be carried out for any suitable period of time.

The steam that is injected via the injection well 112 may be generated at least partially from the produced water, for example, recovered from the production well 100. The produced water is de-oiled and softened to provide at least a portion of feed water to the steam generation facilities. The feed water may include water produced from the hydrocarbon recovery process or, for example, another hydrocarbon recovery process occurring in another reservoir, fresh water, water not previously utilized in the hydrocarbon recovery process, or a combination thereof.

The steam is generated utilizing steam generation facilities. The steam generation facilities may be constructed near a particular reservoir for use in hydrocarbon recovery for that reservoir. The steam generation facilitates are typically located relatively close to the steam injection well. Alternatively, the steam injection well is located close to an existing well pad including a steam injection well to which steam is already provided. Thus, the distance between the steam injection well and either the steam generation facilities or the distance between the steam injection well and a previous steam injection well may be, for example, in the range of 5 km or less. In the case in which the steam injection well is located within about 5 km of an existing well pad, the steam injection well may be located farther from the steam generation facilities.

The steam that is utilized is produced in the steam generation facilities, which include a steam generator, such as a once through steam generator (OTSG). The cost of the steam generation facilities and associated emissions control is significant and reduces the economic potential of hydrocarbon recovery. The use of steam generation facilities a significant distance away, such as several kilometers away, facilitates the use of steam generation facilities for more than one reservoir and improves economic viability of hydrocarbon recovery.

Steam quality, however, degrades over such a distance. Heat loss that occurs, particularly at lower flow rates such as those during a start-up stage, results in reduced steam quality. In particular, with little pressure loss in a steam pipe, as is experienced at low flow rate, heat loss is primarily responsible for the formation of condensate along the steam pipe. At higher flow rates, a pressure drop occurs as steam travels through the piping. Steam travelling through cold piping produces condensate that lowers the quality of steam delivered to the injection well and may result in pooling at low points along the piping. Drains may be utilized to drain off the pooled condensate and the pooled condensate may be trucked back to the steam facilities at great expense. Even with drains to drain the condensate, however, pooling may still result in significant problems such as a water hammer, causing significant damage to the pipeline, and potentially dangerous conditions for workers. A water hammer event, for example, may lead to loss of equipment and shutdown of the pipeline for extended periods of time during which steam is not delivered to the injection well. Any startup or production operation therefore ceases or is delayed, resulting in significant expense and therefore increased cost of recovery of hydrocarbons.

Ambient temperatures outside a steam pipe are significantly lower than inside the steam pipe when the steam pipe is utilized to direct steam to the injection well and into the reservoir. The ambient temperature outside the steam pipe may be, for example, −40° C. or even lower. The steam pipe is therefore insulated to reduce heat loss while directing steam to the injection well. Because of the length of the steam pipe, however, the heat loss is significant and results in condensate in the steam pipe, which is costly to deal with.

With the associated costs to drain and return condensate to the steam facilities and the potential for a catastrophic event (which introduces dangers, added cost to remedy, as well as down time), the length of steam pipelines to deliver steam to a new injection well, is limited, as indicated above.

Figure 3:
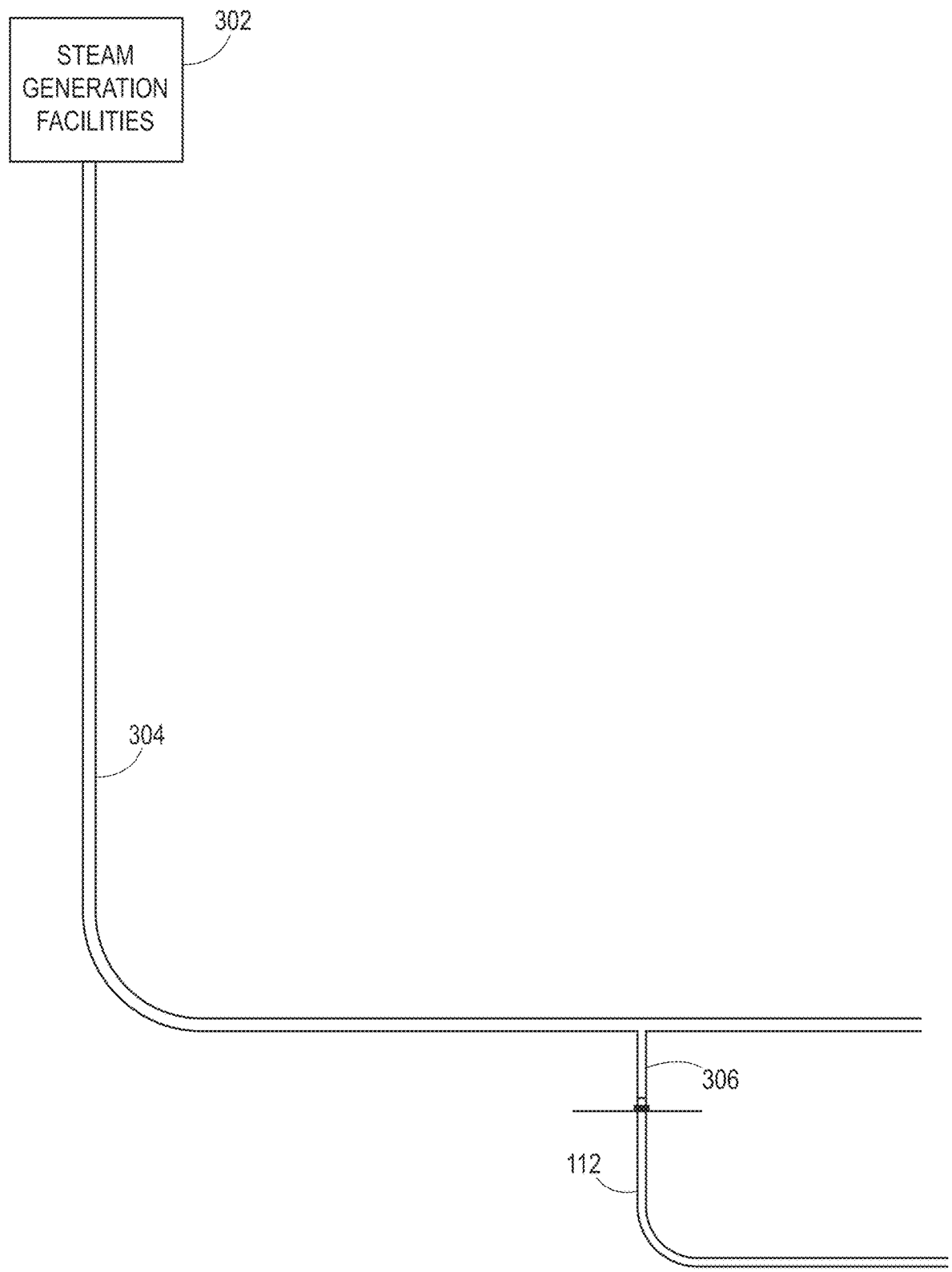
FIG. 3 is a simplified schematic view illustrating a system for use in providing steam in a hydrocarbon recovery operation.

A simplified schematic view illustrating a system for providing the steam for use in the hydrocarbon recovery operation, such as that shown and described with reference to FIG. 1 and FIG. 2, is shown in FIG. 3. For the purpose of this explanation, the steam generation facilities 302 are constructed and utilized for producing hydrocarbons utilizing a plurality of injection wells associated with a reservoir. The steam generation facilities 302 are also utilized in producing hydrocarbons utilizing other injection wells, including the injection well 112 associated with a second reservoir. The steam generation facilities 302 are located a distance, for example, several kilometers, from the injection well 112. The steam generation facilities 302 are fluidly coupled to the injection well 112 by a steam pipe 304 that extends several kilometers. For example, the steam pipe 304 may extend 10 kilometers or more to provide steam generated at the steam generation facilities 302 to the injection well 112.

In the example illustrated in FIG. 3, a smaller, secondary line 306 couples the injection well 112 to the main steam line, referred to herein as the steam pipe 304. The secondary line 306 is smaller in diameter than the steam pipe 304 and extends a much shorter distance.

Ambient temperatures outside the steam pipe 304 are significantly lower than inside the steam pipe 304 when the steam pipe 304 is utilized to direct steam to the injection well 112 and into the reservoir. The ambient temperature outside the steam pipe 304 may be, for example, −40° C. or even lower.

The steam pipe 304 is therefore insulated to reduce heat loss while directing steam to the injection well 112. Because of the length of the steam pipe 304 to direct steam to the injection well 112, the heat loss results in condensate in the steam pipe 304, reducing the quality of the steam injected into the reservoir via the injection well 112.

Figure 4:
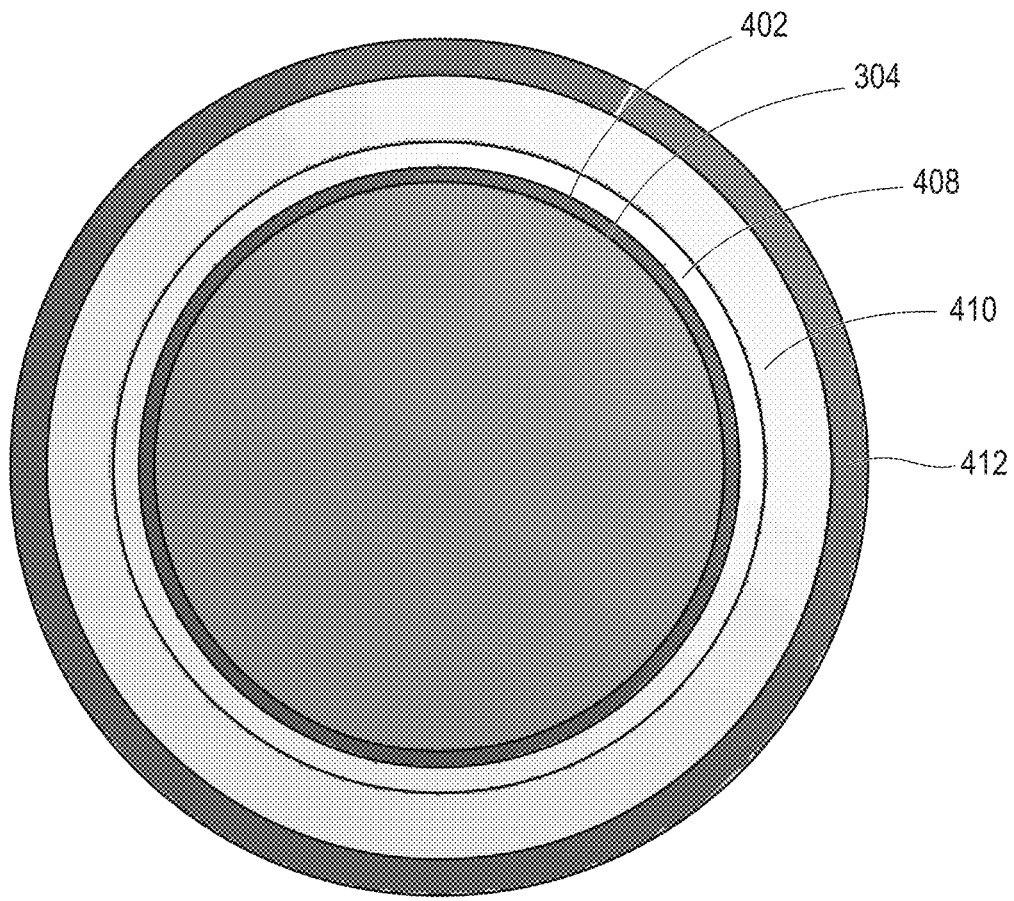
FIG. 4 is a cross-sectional view of the steam pipe in accordance with the present disclosure.
Figure 4:
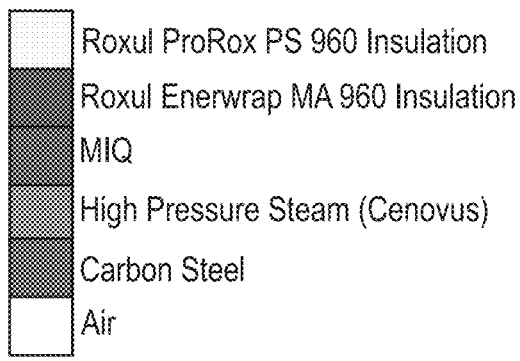

Referring to FIG. 4, a cross-sectional view of the steam pipe 304 is illustrated. The steam pipe 304 may be any suitable size pipe such as, for example, a 20 inch, 30 inch, 36 inch pipe, or any other suitable pipe for use as a trunk line for steam transportation. The steam pipe 304 may be, for example, a carbon steel steam pipe. It will be understood that, for a similar volume of steam, the velocity is higher in smaller pipes and pressure loss increases as the pressure is related to the velocity squared. Larger pipes for steam transportation are beneficial as pressure loss along the pipe is decreased, by comparison to a smaller pipe, by lowering the velocity of the steam travelling through the pipe.

Heat traces 402 extend along the steam pipe 304. The heat traces 402 may be, for example a MIQ™ series heating cable from Thermon™. The heat traces are suitable for high temperatures well above 300° C., for example up to 500° C. In the example illustrated in FIG. 4, a set of 12 heat traces 402 extend along the section of the steam pipe 304 through which the cross-sectional view is taken. The heat traces 402 are generally evenly spaced around the outer diameter of the steam pipe 304 and extend generally along a length of the steam pipe 304.

Any other suitable number of heat traces 402 may extend along the section of the steam pipe 304. For example from 9 heat traces to 27 heat traces may be utilized for a section of the steam pipe 304. In a particular example, 15 traces are generally equally spaced around the outer diameter and along a length of the pipe 304. More heat traces 402 extending along the outside of the steam pipe 304 facilitates operation of the heat traces 402 at lower temperature, for longer periods of time, and facilitates the use of longer heat traces thus extending a greater distance along the steam pipe 304.

Each heat trace 402 extends only a portion of the distance along the steam pipe 304. For example, a set of from 9 to 27 heat traces 402 may extend about 100 meters to about 210 meters along the steam pipe 304. An electrical access point is associated with a set of heat traces 402 and includes a transformer and controller for controlling the heat traces 402. In addition, resistance temperature detectors (RTDs) are located along the steam pipe 304 to measure the temperature at or near a heat trace 402. Several RTDs may be utilized for each set of heat traces 402 such that several RTDs are associated with each electrical access point. The RTDs may be wireless RTDs. The RTDs are utilized to measure the temperature of the steam pipe 304 and the controller controls the heat traces 402 based on the measured temperatures from the RTDs. The controller is programmed to shut off the heat traces 402 when the temperature reaches a predetermined maximum temperature and the heat traces 402 are not turned on again until the temperature is below the predetermined maximum temperature.

Each electrical access point may be associated with two or more sets of heat traces 402. For example, the heat traces 402 extend in opposing directions along the steam pipe 304 from the electrical access point. As indicated above, a set of heat traces 402 may extend about 100 meters to about 210 meters along the steam pipe 304. In the example in which the electrical access point is associated with two sets of heat traces 402 extending in opposite directions, electrical access points are spaced apart about 200 to about 420 meters along the steam pipe 304. The distance between the electrical access points may be less than 200 meters or may be more than 420 meters, depending on the number of passes of heat traces utilized, and the thickness of insulation installed, for example. Utilizing additional heat traces lowers the temperature of each heat trace, facilitating the use of longer heat traces. Thicker insulation, reduces heat loss and lowers the temperature of the heat traces, again facilitating use of longer heat traces and resulting in greater spacing between electrical access points. The electrical access points are located close to the steam pipe 402 and may be located at valves located along the steam pipe 402.

Several sets of heat traces 402 and associated electrical access points are utilized in series along the steam pipe 304 to maintain temperature along the length of the steam pipe 304. Although the heat traces 402 are constructed to heat to temperatures that are higher such that the heat traces may be utilized at higher temperature, the temperature is controlled to reduce the chance of exceeding a safe temperature at which the carbon steel steam pipe 304 is intended to be utilized, thus damaging the steam pipe 304. For example, the temperature may be controlled to heat the steam pipe 304 to a temperature of from about 280° C. to about 343° C. In a particular example, the temperature is controlled to heat the steam pipe 304 to about 300° C.

The steam pipe 304 is also insulated to reduce heat loss. In the present example, a layer of air 408 surrounds the outer diameter of the steam pipe 304 and the heat traces 402 and insulation surrounds the layer of air 408. The insulation may be separated from the steam pipe 304 utilizing spacers to provide the layer of air 408 between the steam pipe 304 and the insulation. The spacers may be low thermal conductivity spacers. The insulation in this example includes an inner insulation 410 and an outer insulation 412. The inner insulation 410 may be, for example, a water repellent pipe insulation such as 4 inch thick Roxul ProRox™ PS 960. The outer insulation 412 may be, for example, 2" thick Roxul Enerwrap™ MA 960.

Figure 5:
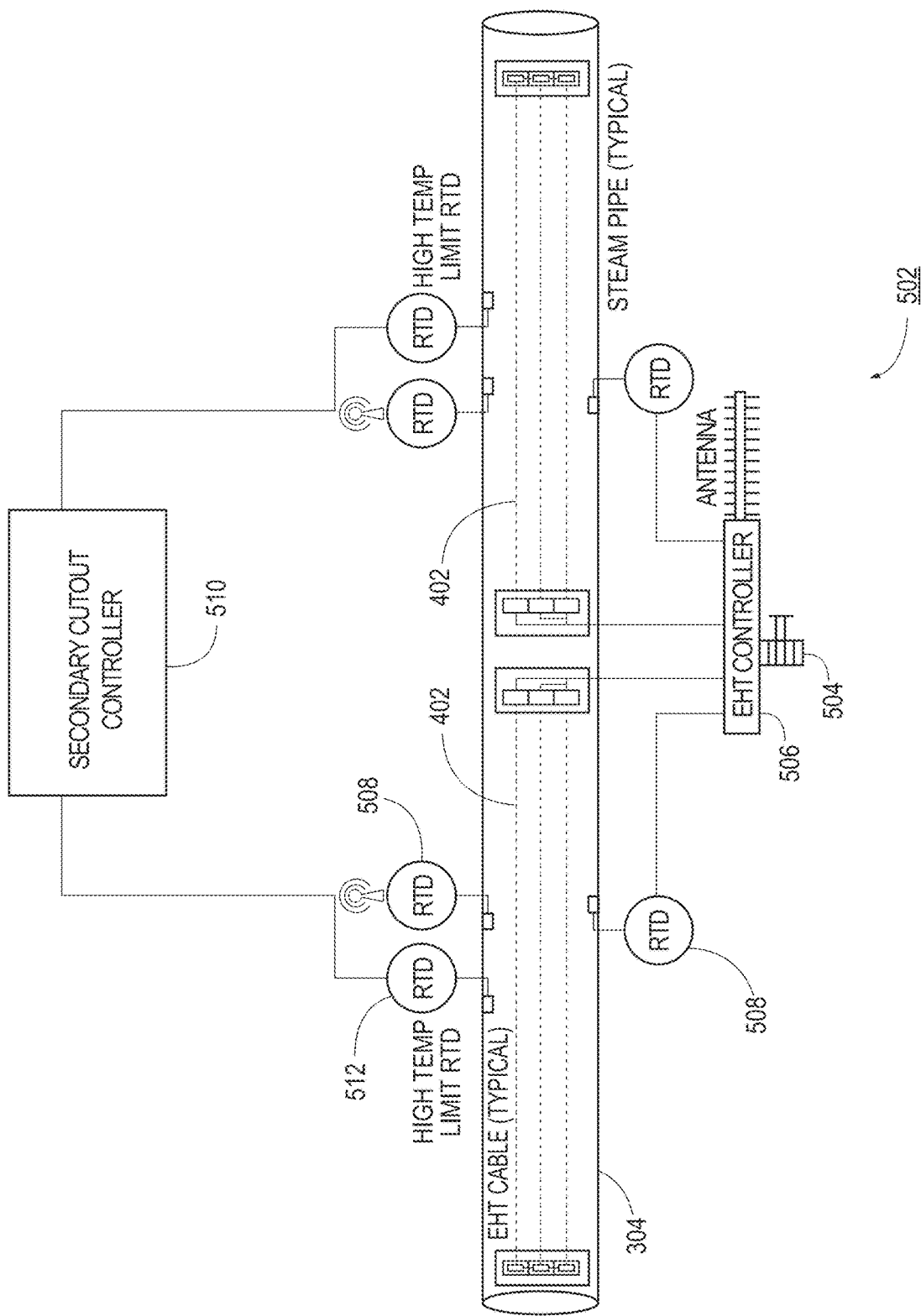
FIG. 5 illustrates a portion of the steam pipe including heat traces extending along the steam pipe in accordance with the present disclosure.

FIG. 5 shows a portion of the steam pipe 304 including heat traces 402 extending along the steam pipe 304. In the example shown in FIG. 5, only 3 heat traces 402 are illustrated. Further heat traces 402, are present and are spaced around the circumference of the steam pipe 304 and extending along the steam pipe 304. As indicated above, each heat trace 402 extends only a portion of the distance along the steam pipe 304.

An electrical access point 502 is associated with a set of heat traces 402 to provide electrical connection and power to the heat traces 402. The electrical access point includes a transformer 504 and controller 506 for controlling the heat traces 402. In addition, resistance temperature detectors (RTDs) 508 are located along the steam pipe 304 to measure the temperature at or near a heat trace 402. Several RTDs 508 are utilized for each set of heat traces 402 such that several RTDs are associated with each electrical access point. The RTDs may be wireless RTDs. The RTDs are utilized to measure the temperature of the steam pipe 304 and the controller controls the heat traces 402 based on the measured temperatures from the RTDs. The controller is programmed to shut off the heat traces 402 when the temperature reaches a predetermined maximum temperature and the heat traces 402 are not turned on again until the temperature is below the predetermined maximum temperature.

Each electrical access point is associated with two sets of heat traces 402 such that the heat traces 402 extend in opposing directions along the steam pipe 304 from the electrical access point 502, as illustrated. In the example illustrated in FIG. 5, a secondary controller 510 is also coupled to further RTDs 512 and acts as a failsafe. The secondary controller 510 may also control power to the heat traces 402 to ensure that the temperature does not exceed a safe temperature at which the carbon steel steam pipe 304 is intended to be utilized, thus damaging the steam pipe 304.

Figure 6:
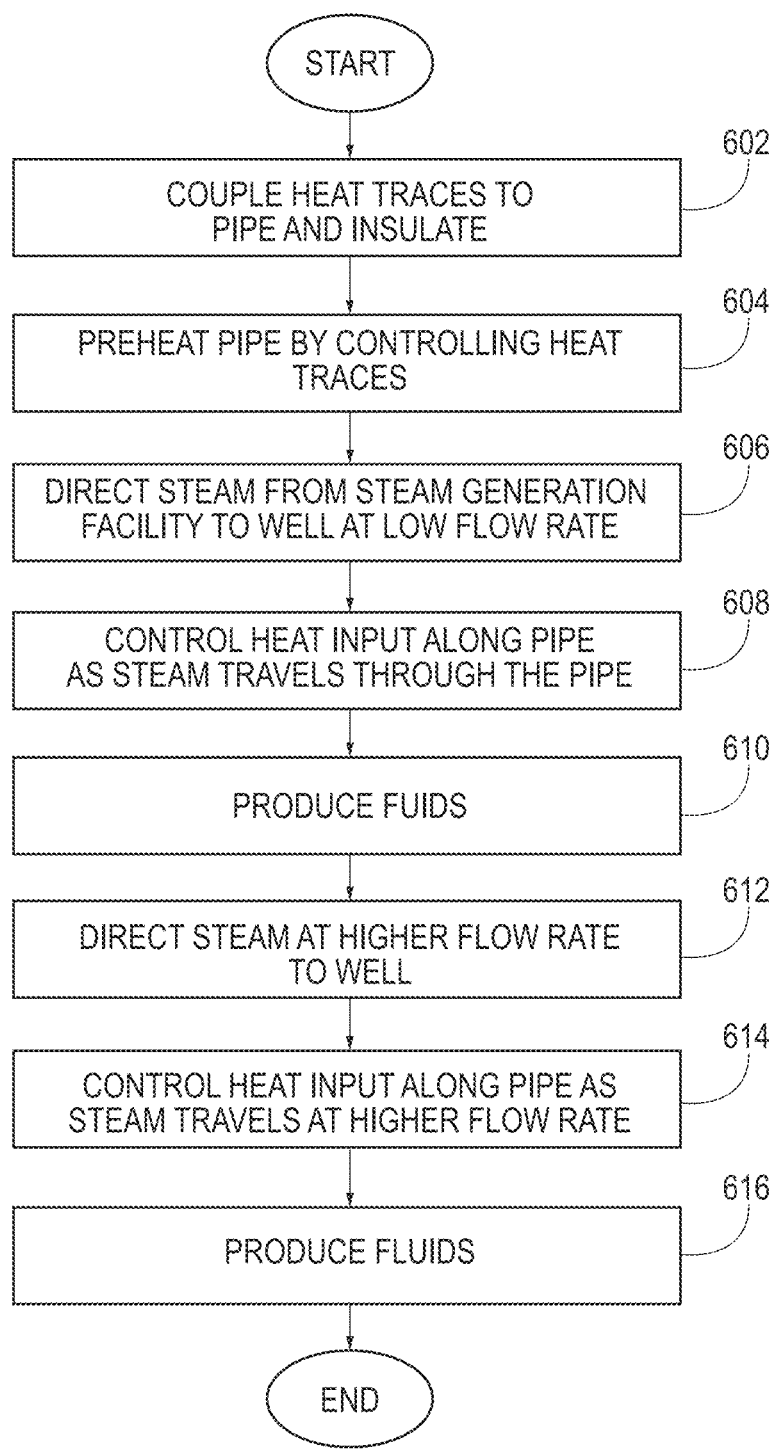
FIG. 6 is a flowchart illustrating a process for providing steam from a steam generation facility to a well of a hydrocarbon-bearing formation.

A flowchart illustrating a process for providing steam from a steam generation facility to a well of a hydrocarbon-bearing formation is illustrated in FIG. 6 and described with continued reference to FIG. 3 through FIG. 5. The process may include additional or fewer elements than shown and described and parts of the method may be performed in a different order than shown or described herein.

The steam pipe 304 is constructed and extends to couple the steam generation facilities 302 to the injection well 112. The heat traces 402 are coupled to the steam pipe 304 at 602 by clamping the heat traces 402 along the steam pipe 304 to maintain contact between each heat trace 402 and the steam pipe 304. The insulation, such as the inner insulation 410 and the outer insulation 412, is added over the heat traces to reduce heat loss to the environment.

Prior to directing steam from the steam generation facilities 302 to the injection well 112, the steam pipe 304 is preheated at 604. The steam pipe 304 is preheated by controlling the heat traces 402 to heat the steam pipe 304 to a temperature at or near an intended operating temperature. For example, the steam pipe 304 may be preheated to a temperature of about 290° C. to about 300° C. Thus, the steam pipe 304 is preheated to about a steam temperature prior to directing steam through the steam pipe 304. To preheat the steam pipe 304, the temperature is measured at various locations along the steam pipe 304, utilizing the RTDs that are located along the steam pipe 304 to measure the temperature at or near a respective heat trace 402. In response to measuring a temperature that is below a preheat target temperature, one or more of the heat traces are controlled to add heat. In response to measuring a temperature that meets the preheat target temperature utilizing an RTD, one or more of the heat traces are temporarily turned off to discontinue adding heat. The preheat target temperature may be a range and the range may include the temperature of the steam prior to directing steam through the pipe. The preheat target temperature may be, for example, from 290° C. to 300° C.

Steam is then directed from the steam generation facility along the steam pipe 304, to the steam injection well 112 at 606, to bring the steam pipe 304 to operating temperature and pressure. The steam is directed along the steam pipe 304 at a low flow rate suitable for the start-up stage in hydrocarbon recovery from a reservoir. The flow rate is gradually increased from zero up to a low flow rate of, for example, about 13,500 bbl/day to about 75,000 bbl/day. In one example a flow rate of about 50,000 bbl/day or even less may be suitable for start-up. At a low steam flow rate, little pressure drop occurs along the steam pipe 304.

The temperature along the steam pipe 304 is measured utilizing the RTDs and the heat traces are controlled based on the temperatures measured as the steam travels through the steam pipe 304. Thus, the heat input along the steam pipe 304 is controlled at 608 as the steam travels through the steam pipe 304. The temperature along the steam pipe 304 is continuously controlled to maintain the temperature at or near the intended operating temperature. Thus, the temperature of the steam pipe 304 is maintained at low flow rates of steam such that the quality of the steam is at least maintained along the pipe and condensate formation is inhibited or at least reduced by comparison to a steam pipe along which the temperature is not maintained.

Fluids are produced via a production well at 610. The fluids produced may include steam and water condensed from the steam as well as connate water from the reservoir. The produced water may be separated from any hydrocarbons and from produced gas. The produced water from the production well may be treated, for example, de-oiled and softened for use as feed water to the steam generation facilities 302.

After the start-up stage, steam at a higher flow rate is directed to the injection well 112 at 612. For example, a steam flow rate of about 200,000 bbl/day may be utilized during the production stage.

The temperature along the steam pipe 304 is continuously measured and the heat traces 402 are controlled at 614 based on the temperatures measured as the steam flows along the steam pipe 304. With higher flow rate of steam, a greater pressure drop occurs through the steam pipe 304 and the heat traces 402 are utilized to provide more heat to maintain the quality of steam. The heat from the heat traces may be insufficient to maintain 100% quality steam while the higher flow rate of steam is employed.

As steam injection continues, an emulsion is produced at 616. The emulsion includes the hydrocarbons recovered from the reservoir as well as water. As indicated above, the produced water may be separated from the hydrocarbons in the emulsion and from produced gas. The produced water from the production well may be treated in a de-oiling and water treatment sub-system to remove or reduce oil in the produced water. The produced water may also be treated in a softener for use as feed water to the steam generation facilities 302.

Advantageously, the heat traces 402 are utilized to deliver heat to the steam pipe 304 over all or most of the distance that the steam pipe 304 extends. Thus, the heat applied to the steam pipe 304 at any one location does not exceed a safe temperature at which the carbon steel steam pipe 304 is intended to be utilized. The heat traces 402 are utilized to preheat the steam pipe 304 prior to directing steam through the pipe and to the injection well 112. Preheating preserves or even improves the quality of the steam delivered to the injection well 112. The heating is particularly advantageous during low flow conditions at start-up.

Utilizing heat tracers 402, steam may be delivered to injection wells located far from the steam generation facilities 302, for example, for a second reservoir located several kilometers from the reservoir for which the steam facilities were initially constructed.

Modeling

Computational fluid dynamics modeling was performed for analysis purposes. The fluid dynamics modeling was carried out under several different conditions, including for different steam pipe size, ambient temperatures, wind speed outside the steam pipe, and operating temperatures.

FIG. 7 through FIG. 10 illustrate modeling results for a process in which the steam in the steam pipe 304 flowed at a velocity of 16.88 m/s and temperature of 300° C. The steam pipe 304 in this example was carbon steel with a wall thickness of 22.2 mm. The inner insulation was Roxul ProRox™ PS 960 with a thickness of 4" (101.6 mm) and the outer insulation was Roxul Enerwrap™ MA 960 with a thickness of 2" (50.8 mm). Fifteen heat traces 402 of MIQ™ series heating cable with a power output of 34.1 W/m were utilized. Ambient temperature was 40° C. below 0 (−40° C.) with a wind speed of 91 km/h.

Material properties utilized for modeling were as set forth in Table 1.

TABLE 1

MATERIAL PROPERTIES

| Material | Density (kg/m³) | Specific Heat (J/kg-° C.) | Thermal Conductivity (W/m-° C.) |
|---|---|---|---|
| Carbon Steel | 7801 | 473 | 43@100° C. |
| | | | 42@200° C. |
| | | | 40@300° C. |
| | | | 36@400° C. |
| | | | 33@600° C. |
| High Pressure Steam | 40.155 | 5320.5 | 0.043 |
| Roxul Enerwrap MA 960 Insulation | 91 | 1173.3 | 0.036@38° C. |
| | | | 0.042@93° C. |
| | | | 0.049@150° C. |
| | | | 0.058@204° C. |
| | | | 0.069@260° C. |
| | | | 0.084@316° C. |
| | | | 0.098@371° C. |
| Roxul ProRox PS 960 Insulation | 112.04 | 1173.3 | 0.036@38° C. |
| | | | 0.042@93° C. |
| | | | 0.050@149° C. |
| | | | 0.058@204° C. |
| | | | 0.068@260° C. |
| | | | 0.081@316° C. |
| | | | 0.091@371° C. |

TABLE 1-continued

In addition, a film coefficient was applied to the inner surface of the steam pipe to account for steam flow.

Figure 7:
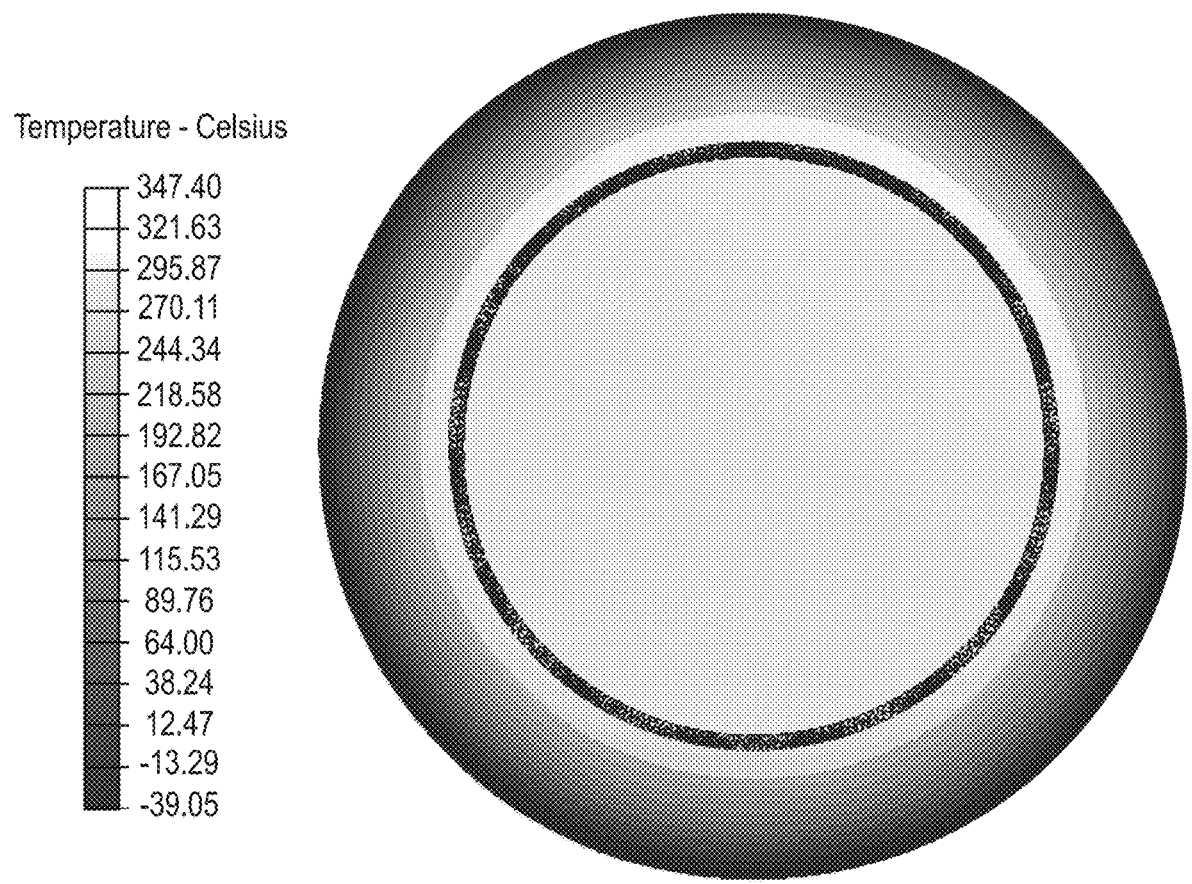
FIG. 7 shows a temperature profile across a steam pipe, heat traces, air gap, inner insulation and outer insulation.
Figure 8:
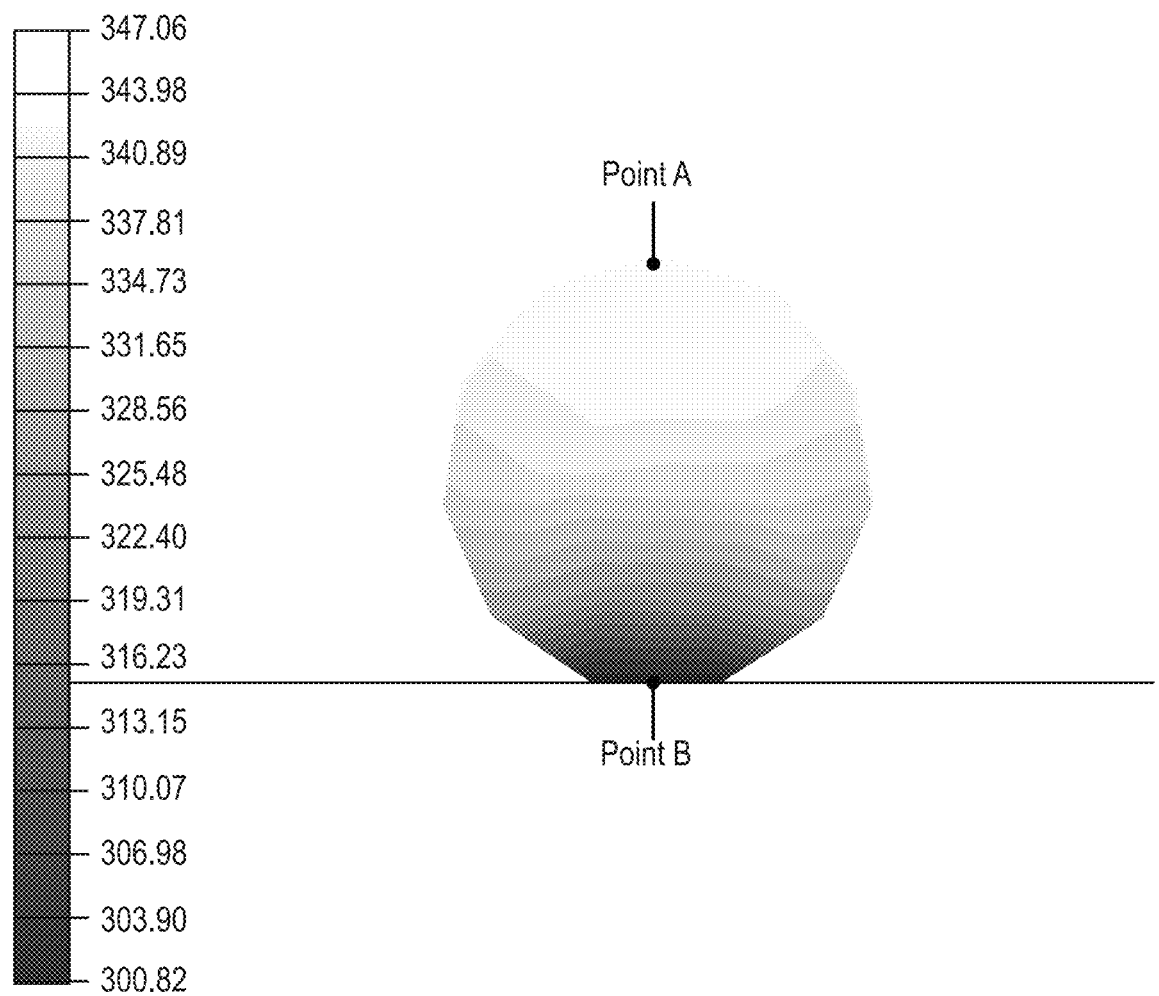
FIG. 8 shows the temperature profile across a cross-section of a heat trace.
Figure 9:
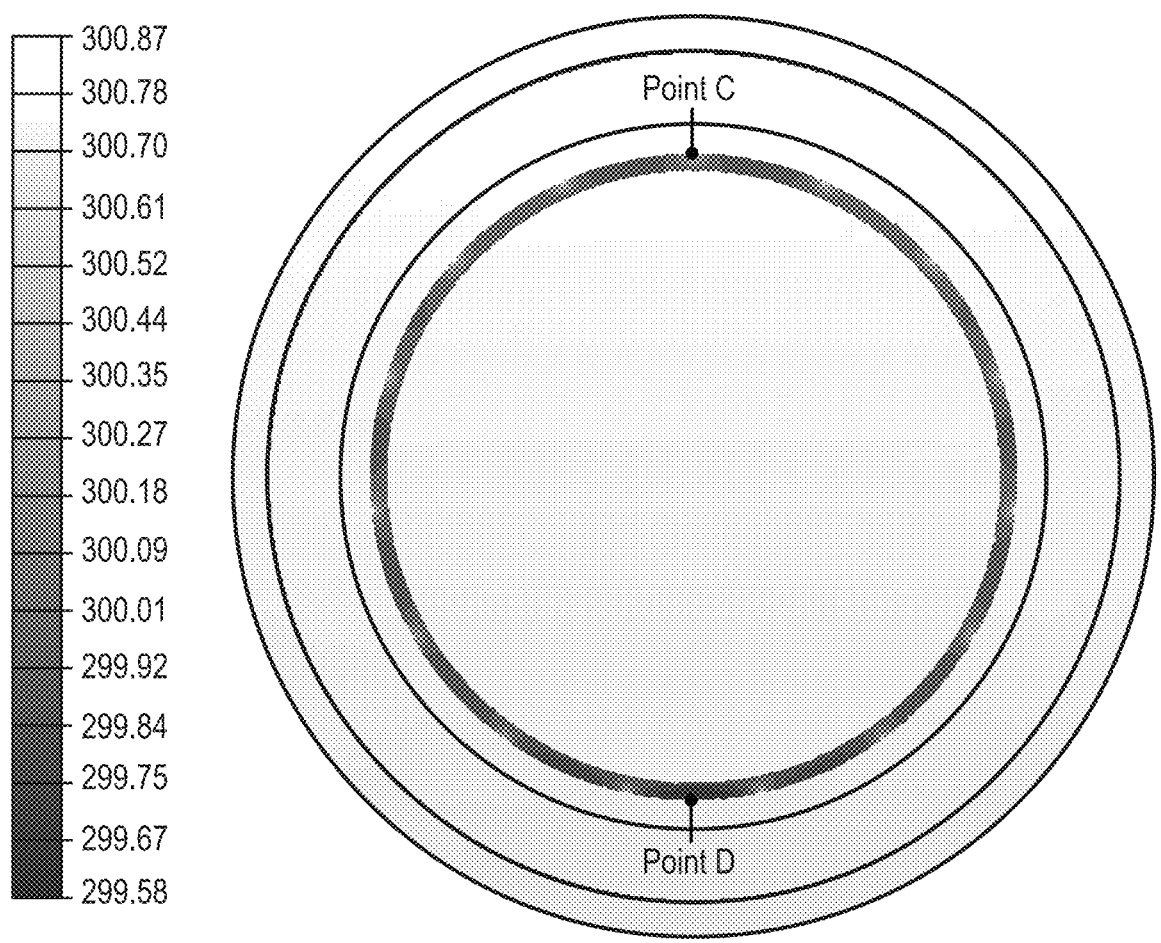
FIG. 9 shows the temperature profile across a cross-section of a steam pipe.
Figure 10:
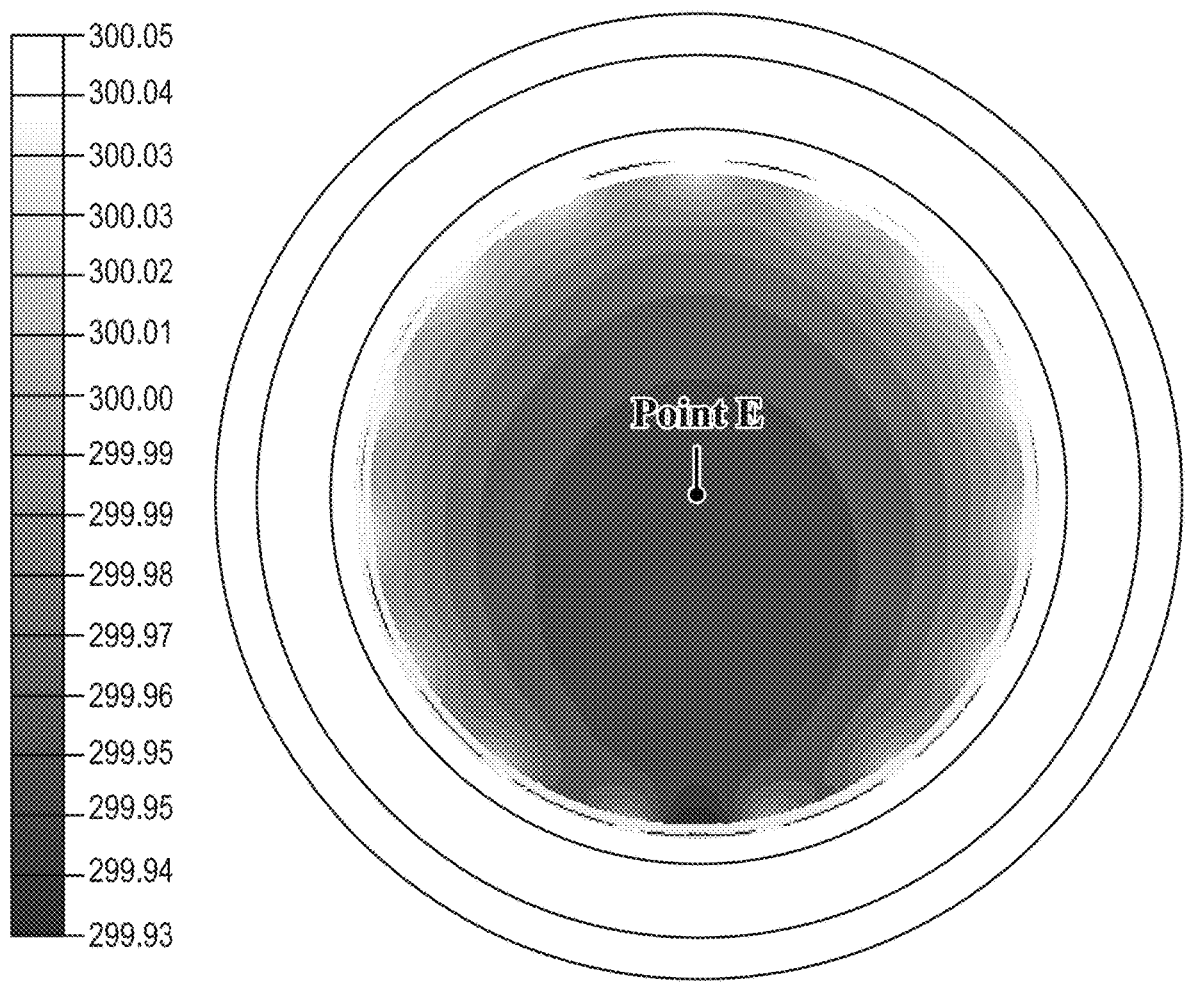
FIG. 10 shows the temperature profile within the steam pipe.
Figure 11:
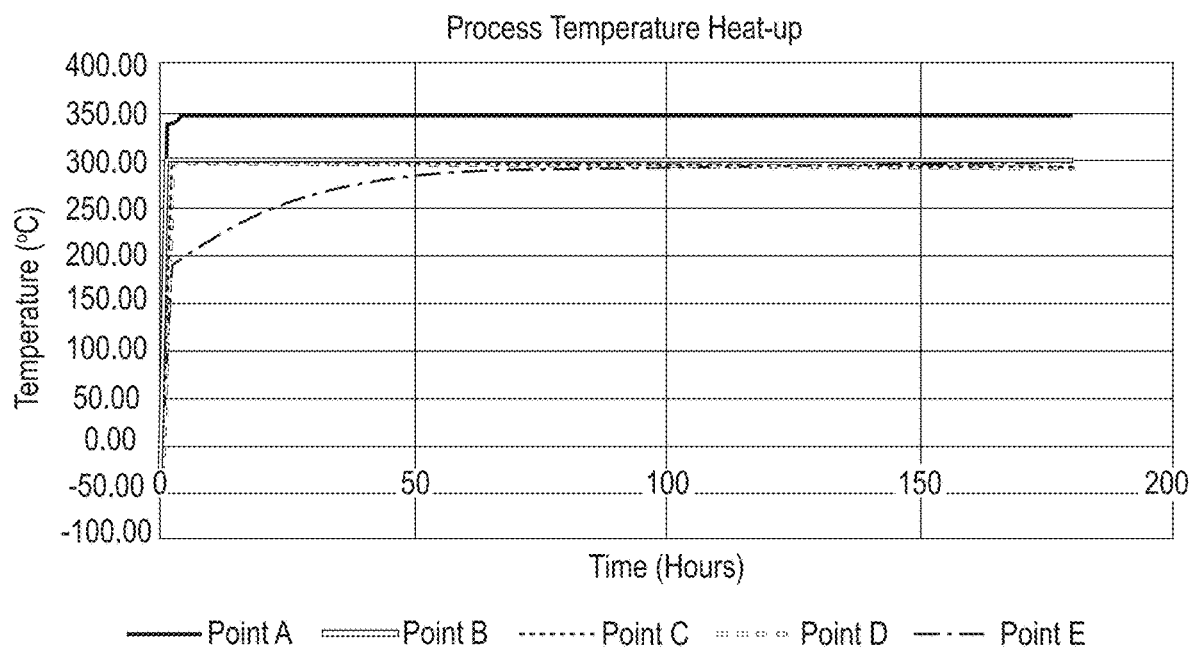
FIG. 11 is a graph showing the change of temperature with time at different locations on a heat trace and in the pipe during preheating of the steam pipe when the pipe is filled with air.

FIG. 7 shows the temperature profile across the entire steam pipe, heat traces, air gap, inner insulation and outer insulation. FIG. 8 shows the temperature profile across a heat trace. As illustrated, the location on the heat trace that is farthest from the contact point with the steam pipe, which in this example is the top of the heat trace, runs above a target temperature, up to 343° C. The steam pipe and the steam in the steam pipe take away the heat such that the carbon steel steam pipe and the point at which the heat trace contacts the steam pipe are closer to 301° C. FIG. 9 shows the temperature profile of the 36" carbon steel steam pipe. FIG. 10 shows the temperature profile within the steam pipe. FIG. 11 is a graph of temperature V. time illustrating the change of temperature with time at different locations on the heat trace and in the pipe during preheating of the steam pipe when the pipe is filled with air. The lines illustrating the preheating at points B, C, and D shown in FIG. 8 and FIG. 9 overlap and appear as a single line. Under the modeled conditions, the center of the steam pipe heats up to 300° C. in about 160 hours.

Simulations and calculations were carried out to evaluate the use of heat traces, in particular electrical heat traces, which are also referred to as EHT. The results below are based on a 36" (914.4 mm) steam pipe configured to maintain a temperature of 300° C. along a 13 km length.

For the purpose of modeling, the following parameters were utilized:
  Insulation Type and Thickness:
    Inner Layer: Aerogel 50 mm
    Outer Layer: Mineral Wool 50 mm
  Insulation K Factors:
    Inner Layer: 0.028 W/m° C.
    Outer Layer: 0.035 W/m° C.
  Maintain Temperature: 300° C.
  Minimum Ambient Temperature: −40° C.
  Maximum Exposure Temperature: 320° C.
  Wind Velocity: 91 km/h
  Area Classification Piping: CL DIV 2 T1
  Power Supply: 600 VAC Heat loss along the steam pipe was calculated to be 427 W/m, including a 25% safety factor. A heat trace length of 170 m or less may be utilized, which is expected to extend along 131 m of steam pipe, assuming an additional 30% of heat trace length to extend along the steam pipe. With 9 heat traces in each set of heat traces, a total of 1530 m of heat traces are utilized for each 131 m of steam pipe. With each electrical access point controlling both upstream and downstream sets of heat traces, electrical access points are located about 262 m apart from each other.

A total of 50 electrical access points were therefore utilized to cover the 13 km of steam pipe and a total electrical load was 8,054,000 W.

With a steam quality of about 98.6% prior to entering the steam pipe, the condensate is drained and the steam introduced to the steam pipe, the steam quality was determined to be about 98.8 at the end of the steam pipe when utilizing the heat traces, as opposed to 97.93 when heat traces were not utilized, assuming 50 mm of aerogel and 50 mm of mineral wool insulation for the case in which heat traces were not utilized. Thus, the quality of the steam exiting the steam pipe is at least equal to or is greater than the quality of the steam entering the steam pipe when utilizing the heat traces as described.

The total load of 8,054,000 W is not sufficient to maintain 100% steam quality along the length of the steam pipe because of pressure loss when operating at pressure for production of hydrocarbons. Additional heat is utilized to maintain 100% steam quality because of the pressure drop during production. An additional heat load of 6.6 MW to total 13.1 MW (with no safety factor) is estimated or an addition 8.3 MW to total 16.4 MW with a 25% safety factor. The additional heat load is a result of the pressure loss and the total heat load.

Figure 12:
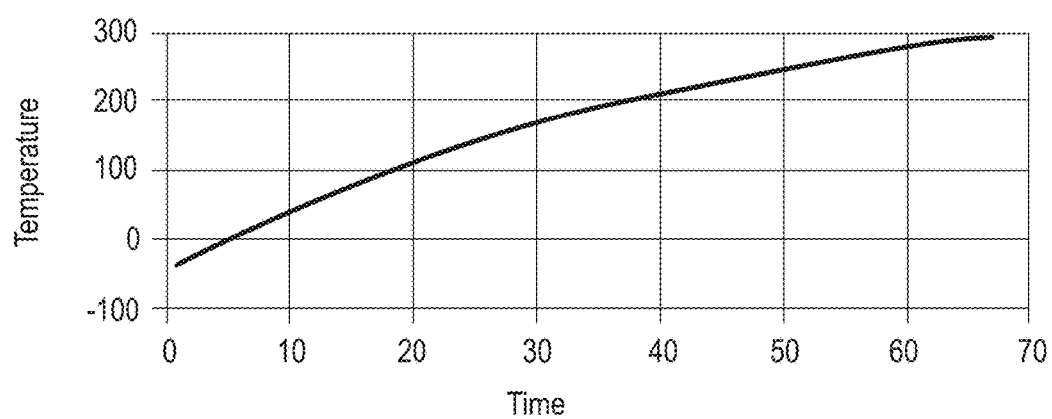
FIG. 12 is a graph showing the change of temperature with time for a steam pipe containing air during preheating utilizing heat traces.

The time to heat up the steam pipe and contents from the initial temperature to a target temperature of 300° C. was determined using the following parameters for air:

Density: 1.514 kg/m$^3$
Specific Heat: 1006 J/kg° C.
Initial Temperature: −40° C.
Final Temperature: 300° C.
Wind Speed: 40 km/h A graph illustrating temperature v. time during preheating a steam pipe utilizing the heat traces with the steam pipe containing air is shown in FIG. 12. As illustrated, the total time for the steam pipe containing only air to reach 300° C. is about 64.5 h.

An additional simulation was conducted for start-up, based on an 8.1 MW input along the steam pipe, a maximum of 20,000 m$^3$/d CWE of steam (~85% of calculated maximum of 23,370 m$^3$/d) is used to maintain 100% steam quality in the line. The maximum flow includes consideration for condensation formation due to both heat loss and pressure drop.

The results of simulations indicate that the heat traces along the steam pipe maintain a temperature of 300° C. when combined with 50 mm of aerogel and 50 mm of mineral wool insulation.

Cost benefits of electrically heat tracing the steam line are improved with insulation and reduced heat loss.

Pre-heating the pipe utilizing heat traces provides substantial advantage. Combined with a reduced flow rate of 20,000 m$^3$/d, the heat traces are utilizable to maintain 100% steam quality in the line.

The described embodiments are to be considered in all respects only as illustrative and not restrictive. The scope of the claims should not be limited by the preferred embodiments set forth in the examples, but should be given the broadest interpretation consistent with the description as a whole. All changes that come with meaning and range of equivalency of the claims are to be embraced within their scope.

The invention claimed is:

1. A hydrocarbon recovery process for recovering hydrocarbons from a hydrocarbon-bearing formation, the process comprising:

preheating a pipe coupling a steam generation facility to a well for injection of steam into the hydrocarbon-bearing formation, by controlling heat traces extending along the pipe;
directing steam generated at the steam generation facility, through the pipe after preheating, and injecting the steam into the hydrocarbon-bearing formation via the well;
controlling heat input to the pipe by controlling the heat traces extending along the pipe as the steam travels through the pipe;
producing fluids from the hydrocarbon-bearing formation.

2. The hydrocarbon recovery process according to claim 1, wherein preheating the pipe comprises preheating the pipe prior to directing the steam through the pipe.

3. The hydrocarbon recovery process according to claim 2, wherein preheating the pipe comprises preheating the pipe to about a steam temperature.

4. The hydrocarbon recovery process according to claim 1, wherein controlling the heat traces comprises controlling, utilizing a plurality of controllers spaced apart along a length of the pipe, the heat traces extending along the pipe.

5. The hydrocarbon recovery process according to claim 4, wherein controlling the heat traces comprises utilizing the plurality of controllers to control respective heat traces that extend along respective portions of the pipe.

6. The hydrocarbon recovery process according to claim 1, wherein directing the steam generated at the steam generation facility, through the pipe after preheating, and injecting the steam into the hydrocarbon-bearing formation is part of a start-up operation of the hydrocarbon recovery process.

7. The hydrocarbon recovery process according to claim 6, comprising:
directing further steam through the pipe at a second flow rate that is higher than a first flow rate of the steam during the start-up operation and injecting the further steam at the second flow rate into the hydrocarbon-bearing formation; and
continuing producing fluids from the hydrocarbon-bearing formation.

8. The hydrocarbon recovery process according to claim 7, comprising continuing controlling heat input to the pipe by continuing controlling the heat traces extending along the pipe as the further steam travels through the pipe.

9. The hydrocarbon recovery process according to claim 1, wherein controlling the heat traces comprises controlling, utilizing a plurality of controllers spaced apart along a length of at least about 10 kilometers of the pipe.

10. The hydrocarbon recovery process according to claim 1, wherein preheating comprises controlling the heat traces to heat the pipe to a temperature of about 280° C. to about 343° C.

11. The hydrocarbon recovery process according to claim 1, wherein controlling the temperature comprises controlling the heat traces such that a quality of the steam is at least maintained along the pipe.

12. The hydrocarbon recovery process according to claim 1, wherein controlling heat input to the pipe comprises controlling the heat traces such that a quality of the steam exiting the pipe is equal to or greater than the quality of the steam entering the pipe.

13. A process for providing steam from a steam generation facility to a well of a hydrocarbon-bearing formation, the process comprising:

measuring temperatures at various locations along a pipe and heating the pipe utilizing heat traces along the pipe to preheat the pipe;

directing the steam through the pipe after preheating;

continuing temperature measurement at the various locations and controlling the heat traces to control heat input to the pipe as the steam flows along the pipe.

14. The process according to claim 13, wherein heating the pipe comprises heating the pipe to about a steam temperature prior to directing the steam through the pipe.

15. The process according to claim 13, wherein the well is remote from the steam generation facility and other wells wherein controlling the heat traces comprises controlling, utilizing a plurality of controllers spaced apart along a length of the pipe, the heat traces along the pipe.

16. The process according to claim 15, wherein controlling comprises controlling, utilizing the plurality of controllers to control respective ones of the heat traces that extend along a respective portion of the pipe.

17. The process according to claim 13, wherein measuring temperatures at various locations along the pipe and heating the pipe, and directing the steam through the pipe after preheating, are part of a start-up operation of a hydrocarbon recovery process.

18. The process according to claim 17, comprising directing further steam through the pipe at a second flow rate that is higher than a first flow rate of the steam during the start-up operation.

19. The process according to claim 18, comprising continuing the temperature measurement at the various locations and controlling the heat traces to control the pipe temperature as the further steam travels through the pipe.

20. The process according to claim 13, wherein controlling the heat traces comprises controlling, utilizing a plurality of controllers spaced apart along a length of at least about 10 kilometers of the pipe.

21. The process according to claim 13, wherein heating the pipe utilizing heat traces along the pipe comprises heating the pipe to a temperature of about 280° C. to about 343° C.

22. The process according to claim 13, wherein controlling the heat traces to control the pipe temperature as the steam flows comprises controlling the heat traces such that a quality of the steam is at least maintained along the pipe.

23. A process for transporting steam from a steam generation facility, the process comprising:

measuring temperatures at various locations along a pipe coupled to the steam generation facility;

preheating the pipe by controlling heat traces that extend along a pipe based on the measured temperatures, wherein in response to a temperature of the measured temperatures being below a preheat target temperature, adding heat utilizing a heat trace of the heat traces, and, in response to the temperature meeting the preheat target temperature, discontinuing adding heat utilizing the heat trace;

directing steam generated at the steam generation facility, through the pipe after preheating to transport the steam from the steam generation facility;

continuing measuring temperatures as the steam travels through the pipe and controlling the heat traces based on the measured temperatures as the steam travels through the pipe.

24. The process according to claim 23, wherein the preheat target temperature comprises a preheat target temperature range that includes a steam temperature prior to directing the steam through the pipe.

25. The process according to claim 23, wherein controlling the heat traces comprises controlling, utilizing a plurality of controllers spaced apart along a length of the pipe and coupled to the heat traces along the pipe.

26. The process according to claim 23, wherein directing steam through the pipe is part of a start-up operation of a hydrocarbon recovery process.

27. The process according to claim 26, comprising directing further steam through the pipe at a second flow rate that is higher than a first flow rate of the steam during the start-up operation.

28. The process according to claim 27, comprising continuing measuring temperatures as the further steam travels through the pipe and controlling the heat traces based on the measured temperatures as the further steam travels through the pipe.

\* \* \* \* \*